(12) United States Patent
Hirose

(10) Patent No.: US 7,666,472 B2
(45) Date of Patent: Feb. 23, 2010

(54) SEALING MATERIAL AND METHOD OF APPLYING THE SAME

(75) Inventor: Katsumi Hirose, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 403 days.

(21) Appl. No.: 10/547,334

(22) PCT Filed: Apr. 13, 2004

(86) PCT No.: PCT/JP2004/005243

§ 371 (c)(1),
(2), (4) Date: Sep. 1, 2005

(87) PCT Pub. No.: WO2004/092296

PCT Pub. Date: Oct. 28, 2004

(65) Prior Publication Data

US 2006/0148927 A1 Jul. 6, 2006

(30) Foreign Application Priority Data

Apr. 14, 2003 (JP) ............................. 2003-108979

(51) Int. Cl.
*C05D 7/22* (2006.01)

(52) U.S. Cl. .................... 427/236; 427/233; 152/504

(58) Field of Classification Search ................. 427/233, 427/236; 152/504
See application file for complete search history.

(56) References Cited

U.S. PATENT DOCUMENTS 4,356,214 A * 10/1982 Soeda et al. ................. 427/233
6,140,418 A * 10/2000 Yamashita et al. ............. 525/88

FOREIGN PATENT DOCUMENTS

JP 53-55802 A 5/1978
JP 54-31104 A 3/1979

OTHER PUBLICATIONS

International Search Report.

* cited by examiner

*Primary Examiner*—Peter D Mulcahy
(74) *Attorney, Agent, or Firm*—Greer, Burns & Crain, Ltd.

(57) ABSTRACT

Disclosed is a sealing material formed of a powdered material into which a rubber base sealing material with a viscosity of 20 to 200 Pa·s/100° C. is pulverized at a temperature lower than, or equal to, a brittle temperature of the rubber base sealing material, and a method of applying the sealing material, which includes applying the powdered material to a surface to be coated with the powdered material, by a spray coating process.

8 Claims, No Drawings

SEALING MATERIAL AND METHOD OF APPLYING THE SAME

TECHNICAL FIELD

The present invention relates to a sealing material, which is easy to apply, which is hard to cause unevenness of coating, and makes a coated surface finished neatly, as well as a method of applying the sealing material.

BACKGROUND ART

A conventional practice has been to apply a rubber base sealing material to the inner surface of a pneumatic tire beforehand for the purpose of causing a puncture hole to be sealed off naturally in a case where a pneumatic tire goes flat.

Rubber base sealing materials are sealing materials (what is termed as raw rubber) obtained by compounding various compounding ingredients to rubber. There have been a variety of rubber base sealing materials proposed heretofore. For example, Japanese patent application Kokai publication No. Sho. 53-55802 has disclosed a rubber base sealing for preventing a tire from being flat out, which comprises polyisobutylene, an inorganic filler and peroxide.

However, the rubber base sealing materials have a higher viscosity (for example, in a case of a sealing material made of butyl rubber, its viscosity is approximately 80 Pa·s/100° C.). Each rubber base sealing material can not be applied to a surface (the inner surface of a pneumatic tire), which is intended to be coated with the rubber base sealing material, by a spray coating process, and resultantly the rubber base sealing material has to be applied manually. For this reason, the rubber base sealing material has had a disadvantage of having poor workability, and causing unevenness of coating easily, and making it impossible to secure a neat, evenly-coated surface.

In addition, if the viscosity of each rubber base sealing material is intended to be decreased through adding a large amount of an organic solvent to the rubber base sealing material for the purpose of making it easy to apply the rubber base sealing material by a spray coating process, the organic solvent has a disadvantage of bringing an adverse effect to the working environment.

SUMMARY OF THE INVENTION

An object of the present invention is to provide a sealing material, which is easy to apply and having better workability, which is hard to cause unevenness of coating, and makes a coated surface finished neatly, as well as a method of applying the sealing material.

A sealing material according to the present invention is characterized by comprising a powdered material into which a rubber base sealing material with a viscosity of 20 to 200 Pa·s/100° C. is pulverized at a temperature lower than, or equal to, a brittle temperature of the rubber base sealing material.

Furthermore, a method of applying a sealing material according to the present invention is characterized by pulverizing a rubber base sealing material with a viscosity of 20 to 200 Pa·s/100° C. into a powdered material at a temperature lower than, or equal to, the brittle temperature of the rubber base sealing material, and subsequently applying the powdered material to a surface which is intended to be coated with the sealing material by a spray coating process.

In this manner, the sealing material according to the present invention is the powdered material which is obtained by the highly-viscous rubber sealing material with the viscosity of 20 to 200 Pa·s/100° C. Additionally, in the case of the present invention, since this powdered material is applied to a surface which is intended to be coated with the sealing material by a spray coating process, the powdered material does not have to be applied manually unlike the conventional method of applying a sealing material. This enables the powdered material to be applied more easily, to have a better workability, to be hard to cause unevenness of coating, and to make the coated surface finished neatly.

BEST MODE FOR CARRYING OUT THE INVENTION

A rubber base sealing material to be used in the present invention may be a general, publicly-known sealing material. For example, the rubber base sealing material is a material as disclosed in Japanese patent application Kokai Publication No. Sho. 53-55802, which comprises polyisobutylene, an inorganic filler and peroxide. However, the rubber base sealing material to be used in the present invention is a material with a viscosity of 20 to 200 Pa·s/100° C.

No matter what kind of rubber may be used as rubber for the rubber base sealing material. For example, any one of the following kinds of rubber may be used alone, or a plurality of the following kinds of rubber may be used in combination: natural rubber, polyisobutylene (isobutylene rubber), butyl rubber (isobutylene-isoprene rubber), isoprene rubber, styrene-butadiene rubber, butadiene rubber, nitryl rubber, ethylene-propylene-diene ternary copolymer rubber, and the like. Among these kinds of rubber, butyl rubber is good in terms of resistance to air permeability. Accordingly, it is advantageous that butyl rubber be used. In addition, a polymer like polybutene, which is other than rubber, may be compounded into a rubber base sealing material comprising butyl rubber depending on the necessity.

As the inorganic filler to be compounded into the rubber, for example, carbon black, silica, zinc oxide and the like can be listed up. Moreover, another compounding ingredient such as stearic acid and paraffin oil may be compounded thereinto depending on the necessity.

In a case where peroxide is intended to be used, a generally-known peroxide may be used (however, peroxide does not always have to be used). As this kind of peroxide, listed are acyl peroxides such as bensoyl peroxide, p-chlorobensoyl peroxide; ketone peroxides such as methyl ethyl ketone peroxide; peroxy esters such as t-butyl peroxy acetate, t-butyl peroxy benzoate, t-butyl peroxy phthalate; alkyl peroxides such as dicumyl peroxide, di-t-butyl peroxy benzoate, 1,3-bis (t-butyl peroxy isopropyl) benzene; hydro peroxides such as t-butyl hydro peroxide; and the like.

A rubber base sealing material to be used in the present invention is a material with a viscosity of 20 to 200 Pa·s/100° C. It is preferable that the rubber base sealing material be a material with a viscosity of 80 to 140 Pa·s/100° C. Reasons for this are as followed. A rubber base sealing material with a viscosity lower than 20 Pa·s/100° C. flows excessively after applied to a surface which is intended to be coated with the rubber base sealing material because of its too low viscosity, and accordingly the rubber base material makes the coated surface uneven. On the other hand, a rubber base sealing material with a viscosity of higher than 200 Pa·s/100° C. does not flow after applied to a surface which is intended to be coated with the rubber base sealing material because of its too high viscosity. Accordingly, the rubber base material makes a thickness of the coat uneven, and makes the coated surface unsmooth. In order to cause the viscosity of a rubber base sealing material to be 20 to 200 Pa·s/100° C., an amount in which compounding ingredients to be used for the rubber base sealing material may be adjusted depending on the necessity.

In the case of the present invention, a rubber base sealing material with a viscosity of 20 to 200 Pa·s/100° C. is pulverized into a powdered material at a temperature lower than, or equal to, the brittle temperature of the rubber base sealing material. The rubber base sealing material is a highly-viscous thickening substance with the viscosity of 20 to 200 Pa·s/100° C., but is made brittle (solidified) at a temperature lower than, or equal to, the brittle temperature of the rubber base sealing material. With this taken into consideration, this rubber base sealing material is pulverized into a powdered material at a temperature lower than, or equal to, the brittle temperature of the rubber base sealing material in the case of the present invention. The material may be pulverized according to a normal method. The rubber base sealing material may be pulverized by use of a low-temperature pulverizer, for example, under an atmosphere of liquid nitrogen. Incidentally, a temperature lower than, or equal to, the brittle temperature of the rubber base sealing material is not a specific one. However, it is preferable that the temperature of the rubber base sealing material be lower than the brittle temperature by 10° C. or more. The particle diameter of the powdered material may be small enough for the powdered material to be sprayed, and may be 3 μm to 8 μm, for example.

In addition, in the case of the present invention, the powdered material obtained in the afore-mentioned manner is applied to a surface which is intended to be coated with the sealing material, for example, the inner surface of a pneumatic tire by a spray coating process. The powdered material may be applied by use of a normal method, for example, by use of an air spray gun or an airless spray gun. When the material is going to be applied, the powdered material is sprayed while kept at a temperature lower than, or equal to, its brittle temperature. This is because, if the temperature at which the powdered material is sprayed exceeds its brittle temperature, the powdered material can not maintain its shape. On the other hand, the temperature of a surface which is intended to be coated with the sealing material may be a normal temperature (approximately 20° C.). However, the surface temperature may be not lower than 20° C., but not higher than 60° C. It is preferable that the surface temperature be not lower than 30° C., but not higher than 50° C. This is because, if the temperature of the surface which is intended to be coated with the sealing material is made higher, the powdered material to be applied by a spray coating process is heated up quickly, and its proper viscosity is recovered soon. This enables the powdered material to be adhered to the surface which is intended to be coated with the material.

EXAMPLES 1 TO 6, COMPARATIVE EXAMPLES 1 AND 2, AND CONVENTIONAL EXAMPLES

Rubber base sealing materials respectively with compound contents (part by weight) as shown in Table 1 were applied to the inner surface of a pneumatic tire (tire size: 195/65R15).

Before the application, first of all, the rubber base sealing materials were pulverized into the respective powdered materials with a particle diameter of approximately 3 μm to 8 μm by use of a low-temperature pulverizer at a pulverization temperature lower than, or equal to, the brittle temperatures respectively of the rubber base sealing materials. The powdered materials thus obtained were applied respectively to the inner surfaces of the pneumatic tires by a spray coating process using an air spray gun while the powdered materials were kept at their pulverizing temperatures (Examples 1 to 6, and Comparative Examples 1 and 2). Incidentally, compound ingredients as shown in Table 1 were mixed respectively into the rubber base sealing materials. Thereafter, the rubber base sealing materials were heated at a temperature of 120° C. for one hour, and thereby preparatory partially-vulcanizing processes were applied respectively to the rubber base sealing materials. Conditions for the spraying process were as followed. A spraying machine of gravity drop type was used as an air spray gun. The powdered materials were dropped near the spray nozzle. A flow speed at which the powdered materials were sprayed out from the spray nozzle was set at 20 m/s to 100 m/s. The diameter of the orifice of the spraying machine of gravity drop type was set so as to be large enough for the aforementioned flow speed to be achieved, and for the powdered materials to be sprayed out sufficiently.

The temperatures of the inner surfaces (temperatures of coated surfaces) respectively of the pneumatic tires were as shown in Table 1.

With regard to the conventional example, its rubber base sealing material has a higher viscosity if it is placed at the normal temperature. For this reason, the rubber base sealing material to be calendered into a sheet was stuck to the inner surface of the tire manually. In this manner, the inner surface of the pneumatic tire (tire size: 195/65R15) was coated with the rubber base sealing material.

Workabilities respectively for applying the rubber base sealing materials and degrees of evenness in coated thickness respectively of the rubber base sealing materials are as shown in Table 1. Incidentally, symbol "○" means "good," symbol "Δ" means "fairly good although short of "○," and symbol "x" means "poor."

In the case of Comparative Example 1 in Table 1, the rubber base sealing material had a lower viscosity. For this reason, the rubber base sealing material flew excessively after applied to the inner surface of the tire, and accordingly the thickness of the coated surface became uneven. In the case of Example 1, the temperature of the coated surface was lower. For this reason, the viscosity of the sealing material to be applied to the inner surface of the tire was not quickly changed to an effective viscosity, and accordingly the thickness of the coated surface became slightly uneven. In the case of Example 6, the temperature of the coated surface was too high. For this reason, the viscosity of the sealing material to be obtained after applied to the inner surface of the tire was lower, and accordingly the flatness of the coated surface was slightly deteriorated. Incidentally, if the temperature of the coated surface is too high, it is likely that the too high temperature may adversely affect the tire per se. In the case of Comparative Example 2, the viscosity of the rubber base sealing material was high. For this reason, the sealing material did not flow after applied to the inner surface of the tire, and accordingly the thickness in the coated area varied locally. This variation disappeared, and accordingly the coated surface did not become flat. As a result, the thickness of the coated surface was uneven.

TABLE 1

| COMPOUND CONTENTS OF RUBBER BASE SEALING MATERIAL (WEIGHT) | | | COMPARATIVE EXAMPLE 1 | EXAMPLE 1 | EXAMPLE 2 | EXAMPLE 3 | EXAMPLE 4 |
|---|---|---|---|---|---|---|---|
| BUTYL RUBBER | | BEYER BUTYL 301 | 100 | 200 | 100 | 100 | 100 |
| FEF CARBON | | NIPPON STEEL CHEMICAL CO., LTD., HTC#100 | 20 | 20 | 20 | 20 | 20 |
| POLYBUTENE | LOW MOLECULAR WEIGHT | NIPPON PETROCHEMICALS CO., LTD., POLYBUTENE HV-15 | 200 | 200 | 200 | 150 | |
| | HIGH MOLECULAR WEIGHT | NIPPON PETROCHEMICALS CO., LTD., HV-1900 | | | | | 200 |
| ZnO | | SEIDO CHEMICAL INDUSTRY CO., LTD., ZINC OXIDE JIS3 | 5 | 5 | 5 | 5 | 5 |
| STEARIC ACID | | NIPPON OIL & FATS CO., LTD., BIS STEARIC ACID | 1 | 1 | 1 | 1 | 1 |
| PARAFFIN OIL | | JAPAN SUN OIL COMPANY, LTD., SUNPAR 2280 | 10 | | | | |
| QUINONEDIOXIME | | OUCHISHINKO CHEMICAL INDUSTRIAL CO., LTD., VULNOC GM | 6 | 6 | 6 | 6 | 6 |
| VULCANIZATION ACCELERATOR DM | | SANSHIN CHEMICAL INDUSTRY CO., LTD., SANCELER DM | 4 | 4 | 4 | 4 | 4 |
| MINIUM | | NIHON KAGAKU SANGYO CO., LTD., MINIUM SP | 2 | 2 | 2 | 2 | 2 |
| VISCOSITY | Pa·s/100° C. | | 15 | 20 | 20 | 100 | 120 |
| BRITTLE TEMPERATURE | ° C. | | −40 | −30 | −30 | −30 | −45 |
| PULVERIZATION TEMPERATURE | ° C. | | −50 | −40 | −40 | −40 | −55 |
| TEMPERATURE OF COATED SURFACE | ° C. | | 30 | 15 | 30 | 30 | 30 |
| WORKABILITY FOR APPLYING RUBBER BASE SEALING MATERIAL TO INNER SURFACE OF TIRE | | | ○ | ○ | ○ | ○ | ○ |
| EVENNESS IN COATED THICKNESS OF RUBBER BASE SEALING MATERIAL | | | X | Δ | ○ | ○ | ○ |

| COMPOUND CONTENTS OF RUBBER BASE SEALING MATERIAL (WEIGHT) | | | EXAMPLE 5 | EXAMPLE 6 | COMPARATIVE EXAMPLE 2 | CONVENTIONAL EXAMPLE |
|---|---|---|---|---|---|---|
| BUTYL RUBBER | | BEYER BUTYL 301 | 100 | 100 | 100 | 100 |
| FEF CARBON | | NIPPON STEEL CHEMICAL CO., LTD., HTC#100 | 20 | 20 | 20 | 20 |
| POLYBUTENE | LOW MOLECULAR WEIGHT | NIPPON PETROCHEMICALS CO., LTD., POLYBUTENE HV-15 | | | | 165 |
| | HIGH MOLECULAR WEIGHT | NIPPON PETROCHEMICALS CO., LTD., HV-1900 | 180 | 180 | 150 | |
| ZnO | | SEIDO CHEMICAL INDUSTRY CO., LTD., ZINC OXIDE JIS3 | 5 | 5 | 5 | 5 |
| STEARIC ACID | | NIPPON OIL & FATS CO., LTD., BIS STEARIC ACID | 1 | 1 | 1 | 1 |
| PARAFFIN OIL | | JAPAN SUN OIL COMPANY, LTD., SUNPAR 2280 | | | | |
| QUINONEDIOXIME | | OUCHISHINKO CHEMICAL INDUSTRIAL CO., LTD., VULNOC GM | 6 | 6 | 6 | 6 |
| VULCANIZATION ACCELERATOR DM | | SANSHIN CHEMICAL INDUSTRY CO., LTD., SANCELER DM | 4 | 4 | 4 | 4 |
| MINIUM | | NIHON KAGAKU SANGYO CO., LTD., MINIUM SP | 2 | 2 | 2 | 2 |
| VISCOSITY | Pa·s/100° C. | | 200 | 200 | 230 | 80 |
| BRITTLE TEMPERATURE | ° C. | | −30 | −30 | −30 | −30 |
| PULVERIZATION TEMPERATURE | ° C. | | −40 | −40 | −40 | −40 |
| TEMPERATURE OF COATED SURFACE | ° C. | | 30 | 65 | 30 | 30 |

TABLE 1-continued

| | | | | |
|---|---|---|---|---|
| WORKABILITY FOR APPLYING RUBBER BASE SEALING MATERIAL TO INNER SURFACE OF TIRE | ◯ | ◯ | ◯ | X |
| EVENNESS IN COATED THICKNESS OF RUBBER BASE SEALING MATERIAL | ◯ | ◯ | X | ◯ |

Consequently, as clearly understood from Table 1, the rubber base sealing materials (Examples 1 to 6) according to the present invention are hard to cause unevenness of coating in comparison with the rubber base sealing materials according to Comparative Examples 1 to 2, and have better workabilities in comparison with Conventional Example.

INDUSTRIAL APPLICABILITY

As described above, in the case of the present invention, a rubber base sealing material with a higher viscosity is pulverized into a powdered material at a temperature lower than, or equal to, its brittle temperature. Subsequently, the powdered material is applied to a surface, which is intended to be coated with the sealing material, by a spray coating process. For this reason, the rubber base sealing material is easy to apply, and accordingly has a better workability. The material is hard to cause unevenness of coating, and makes a coated surface finished neatly. In addition, the material can be applied with an arbitrary thickness.

The rubber base sealing material, and the method of applying the material, according to the present invention are applied to not only a pneumatic tire, but also the sealing of the roof, a bathroom and the like of a house, the sealing of interstices between each of lumps and the body of a motor vehicle, the sealing of laminated glass, as well as the like.

What is claimed is:

1. A method of applying a sealing material, comprising the steps of:
    pulverizing a rubber base sealing material with a viscosity of 20 to 200 Pa·s/100° C. into a powdered material at a temperature lower than, or equal to, a brittle temperature of the rubber base sealing material;
    subsequently applying the powdered material to a surface which is spray coated with the sealing material, and
    wherein the surface which is spray coated with the sealing material is the inner surface of a pneumatic tire.

2. The method of applying a sealing material according to claim 1, wherein the rubber base sealing material comprises butyl rubber.

3. The method of applying a sealing material according to claim 2, wherein the rubber base sealing material further includes polybutene.

4. The method of applying a sealing material according to claim 1, wherein the temperature lower than, or equal to, the brittle temperature of the rubber base sealing material is lower than the brittle temperature by 10° C. or more.

5. The method of applying a sealing material according to claim 1, wherein the diameter of a particle of the powdered material is 3 μm to 8 μm.

6. The method of applying a sealing material according to claim 1, wherein the rubber base sealing material is pulverized at a temperature lower than, or equal to, the brittle temperature of the rubber base sealing material under an atmosphere of liquid nitrogen.

7. The method of applying a sealing material according to claim 1, wherein the temperature of the inner surface of the pneumatic tire which is spray coated with the sealing material is not lower than 20° C., and not higher than 60° C.

8. The method of applying the sealing material according to claim 1, wherein the viscosity of the rubber base sealing material is in a range of 80 to 140 Pa·s/100° C.

\* \* \* \* \*